US007804779B2

(12) United States Patent
Grenot et al.

(10) Patent No.: US 7,804,779 B2
(45) Date of Patent: Sep. 28, 2010

(54) METHOD AND DEVICE FOR REMOTELY CONTROLLING THE CONGESTION OF MESHED FLOW IN A PACKET MODE TELECOMMUNICATION NETWORK

(75) Inventors: Thierry Grenot, Meudon (FR); Florian Bonnet, L'Hay les-Roses (FR); Bernard Imbert, Paris (FR); Jacques Provost, Savigny-sur-Orge (FR)

(73) Assignee: Ipanema Technologies, Fontënay-Aux-Rosses (FR)

( * ) Notice: Subject to any disclaimer, the term of this patent is extended or adjusted under 35 U.S.C. 154(b) by 158 days.

(21) Appl. No.: 12/095,944

(22) PCT Filed: Dec. 6, 2006

(86) PCT No.: PCT/EP2006/069376

§ 371 (c)(1),
(2), (4) Date: Jun. 3, 2008

(87) PCT Pub. No.: WO2007/065911

PCT Pub. Date: Jun. 14, 2007

(65) Prior Publication Data

US 2008/0304414 A1     Dec. 11, 2008

(30) Foreign Application Priority Data

Dec. 9, 2005   (FR) .................................. 05 53814

(51) Int. Cl.
G08C 15/00 (2006.01)
(52) U.S. Cl. ....................... 370/235; 370/231; 370/252; 370/352

(58) Field of Classification Search ................. 370/231, 370/232, 235
See application file for complete search history.

(56) References Cited

U.S. PATENT DOCUMENTS

| 5,638,377 | A | * | 6/1997 | Quinquis et al. | 370/392 |
|---|---|---|---|---|---|
| 6,636,512 | B1 | * | 10/2003 | Lorrain et al. | 370/392 |
| 6,847,653 | B1 | * | 1/2005 | Smiroldo | 370/462 |
| 6,922,390 | B1 | * | 7/2005 | Chapman et al. | 370/229 |
| 7,457,244 | B1 | * | 11/2008 | Ye et al. | 370/230 |
| 2002/0075855 | A1 | * | 6/2002 | Bruno et al. | 370/352 |
| 2003/0217129 | A1 | * | 11/2003 | Knittel et al. | 709/223 |
| 2005/0169179 | A1 | * | 8/2005 | Antal et al. | 370/231 |
| 2006/0050636 | A1 | * | 3/2006 | Menth | 370/230 |

FOREIGN PATENT DOCUMENTS

| FR | 2-804-808 | 8/2001 |
|---|---|---|
| WO | 01-58094 | 8/2001 |
| WO | 01-80485 | 10/2001 |
| WO | 2004-066567 | 9/2004 |

OTHER PUBLICATIONS

International Search Report Dated Mar. 12, 2007.

* cited by examiner

*Primary Examiner*—Ricky Ngo
*Assistant Examiner*—Rasheed Gidado
(74) *Attorney, Agent, or Firm*—Pearne & Gordon LLP

(57) ABSTRACT

The invention relates to a method for remotely controlling the congestion of meshed flow exchanged in a packet mode telecommunication network between a number N of central sites $C_i$ provided with flow management devices and a number M of remote sites $D_m$ devoid of such devices. According to the invention, said active devices of central sites $C_i$ exchange between them information intended specifically for the management of flows exchanged between each of the central sites $C_i$ and each of the remote sites $D_m$.

9 Claims, 5 Drawing Sheets

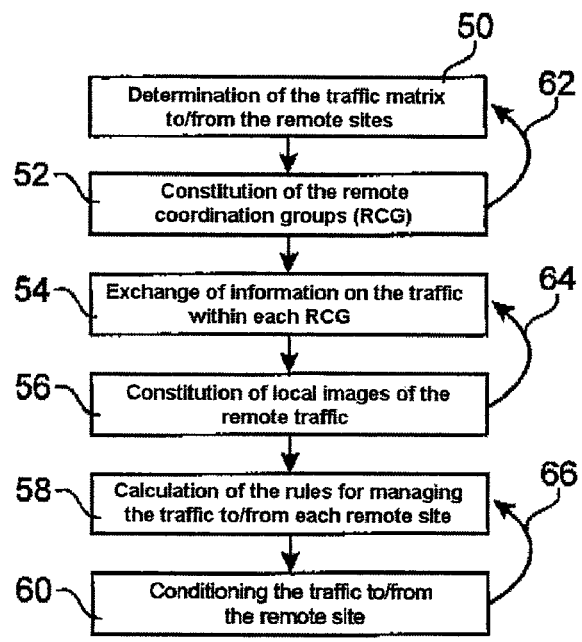

FIG.5

| Remote site $D_m$ / Central site $C_i$ | $D_1$ | $D_2$ | $D_3$ | $D_4$ | $D_5$ | $D_6$ |
|---|---|---|---|---|---|---|
| $C_1$ | 1 | 1 | 1 | 0 | 0 | 0 |
| $C_2$ | 1 | 1 | 1 | 1 | 1 | 1 |
| $C_3$ | 0 | 0 | 1 | 0 | 1 | 1 |

Line $C_i$ = list of remote sites having traffic with the central site I

Column $D_m$ = list of central sites having traffic with the remote site m

Mim = 0   no traffic between Ci and Dm
Mim = 1   traffic between Ci and Dm

FIG.6

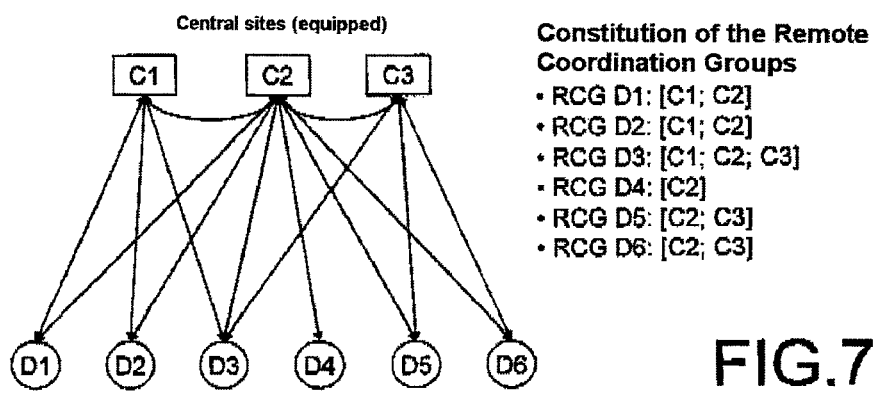

Constitution of the Remote Coordination Groups
- RCG D1: [C1; C2]
- RCG D2: [C1; C2]
- RCG D3: [C1; C2; C3]
- RCG D4: [C2]
- RCG D5: [C2; C3]
- RCG D6: [C2; C3]

FIG.7

METHOD AND DEVICE FOR REMOTELY CONTROLLING THE CONGESTION OF MESHED FLOW IN A PACKET MODE TELECOMMUNICATION NETWORK

TECHNICAL FIELD

The invention relates to the field of telecommunications and relates more specifically to a method for remotely controlling the congestion of meshed flow exchanged in a packet mode telecommunication network between a number N of central sites $C_i$ provided with flux management devices and a number M of remote sites $D_m$ devoid of such devices.

The invention also relates to a device intended to implement this method.

The invention applies regardless of the geographical extent of the network, regardless of the flow carried by the latter and regardless of the number of users of this network. It functions in particular in the case where users of a same remote site $D_m$ communicate simultaneously with several central sites $C_i$ thus forming meshed flow.

The invention is independent of packet mode network technologies, but is particularly adapted to networks using the IP protocol (Internet Protocol) such as for example the Internet network or VPN networks (for Virtual Private Networks). The latter offer an interconnection at the IP level in a private way for a given group of users (typically a company or an organisation with several establishments), while still using a shared network infrastructure (Internet, for example).

PRIOR ART

Packet mode telecommunication networks are characterised in that the information routed is carried in groups called packets, substantially constituted of a header containing information for routing the packet in the network and the data to be transmitted. Addressing information contained in the headers make it possible to identify the flow of information between the final applications. These packets are carried across the network, and as directed by this network, make use of the most varied means of transmission and switching. The most currently used technology for these packet mode telecommunication networks is the IP protocol (Internet Protocol). This protocol is used end-to-end, and can be carried on very diverse transmission networks such as for example Ethernet networks, FR networks (Frame Relay), ATM networks (Asynchronous Transfer Mode), SDH networks (Synchronous Digital Hierarchy), SONET networks (Synchronous Optical Network), MPLS networks (Multiprotocol Label Switching), or DWDM networks (Dense Wavelength Digital Multiplexing), etc.

The packets are typically emitted by a large number of sources functioning independently in relation to one another, to a large number of destinations also functioning independently in relation to one another.

FIG. 1 gives an example of such a network:

Users 2 can be either individual users, or agencies, companies (with their own internal local network), etc.

Transit network 4 shows the central portion, generally of high capacity and covering a large territory (the whole world in the case of the Internet network). This network is generally shared by a multitude of users and/or private networks.

Access networks 6 are generally of average or slow rate, and shared between users located in a limited geographical zone. The "local loop", wired, optical, radio, etc. link between the user and the access service provider is considered in what follows as a part of the access network.

Quality of Service

The Quality of Service is constituted by all of the pertinent characteristics that affect the transfer of information between two given points of a network. It is defined in particular by:
the quality of the access to the service;
the availability of the service;
the time needed to restore service in case of a failure;
the quality of service for information transfer;
the transfer delay of information between the source and the destination;
the variation in the transfer delay of information (jitter);
the degradation of the information carried (losses, errors);
the quantity of information that can effectively be carried on the network (bandwidth).

The geographical extent, the high degree of sharing infrastructure equipment between a high number of users, the variety of the flow exchanged and the complexity of the architectures deployed make it very difficult to predict and guarantee Quality of Service on such networks.

The rate that it is possible to handle between two given users, the transfer delay of information, the variation in this delay over time (jitter) and the associated loss rate are fundamental elements of this Quality of Service. Controlling these is the only way to deploy critical professional services (transport of voice, images, transactions, critical data, electronic commerce, etc.).

A common way to improve the quality of service is to overdimension the capacity of the network. However, in light of the high investment and usage costs of these networks, it is desirable to make maximum use of them, and such a very costly solution is therefore of limited use.

Devices (protocols, equipment for transmitting, switching, routing, etc.), that depend on the type of the different networks, can be implemented to manage these elements of Quality of Service. They are in general based on on-demand resource reservation and priority mechanisms (ATM, RSVP on IP, etc.) or in terms of the configuration (ATM, DiffServ on IP, etc.). These devices in general have a scope limited to one portion of the network only. In constant mutation, they interoperate with difficulty.

In all cases, the result is highly dependent on the behaviour of the source users: emission rate, regularity of the traffic, traffic matrix, etc. This behaviour is very difficult to predict, due to the large variety of applications using the networks (transport of voice, images, file transfers, database consultation, etc.), of the multiplicity of the users present and of the wide range in their needs.

Also in all cases, the result is highly dependent on the rules for engineering and configuring the multiple parameters of the network. These rules are very difficult to determine, especially due to the size of the networks, the large variety of technologies implemented at a given moment (non-homogenous set) and of the multiplicity of the organisations (service access operators, point of presence operators, long distance carriers, etc.) involved from one end to the other of the path.

The Phenomenon of Congestion in the Networks

Congestion is defined as a state wherein the use of the resource reaches the maximum capacity that this resource is able to provide. In the case of networks, this is substantially the bandwidth: a link or a link element is congested when the information rate is drawing near, is reached or even tries to exceed the maximum rate that this link or that this link element is able to carry without degradation (loss of information, delays, etc.).

The Quality of Service is mainly linked to the congestion of the different elements of the network used by the information during the transfer thereof. Although there is an infinite amount of gradations, the cases of operation encountered by these two modes can be outlined as follows:

Either there is no allocation of resources, and the network does its best to relay the information to the recipient, according to the activity of the sources;

Or there is a resource allocation mechanism, and the quantity of information injected into the network by each source is more or less controlled.

In all cases, systems for temporary storage in queues (memory), located at each point of multiplexing, concentration or switching, make it possible to process the arrival simultaneity of the packets. The instantaneous rate of memory occupation encountered by a packet and the management policy (priority, number of queues, rules for emptying, rejecting, etc.) implemented at the level of each queue determine the time spent by a packet in this device, as well as its possible rejection.

The transfer delay between two points of the network is due:

to the sum of the times to cross the lines, cables, optical fibres, satellite links, etc. used; this delay is in general fixed, and for the most part depends on the media and the distance travelled by the information, to the sum of the times to cross the queues in the various devices; this delay is globally due to the instantaneous load encountered by each packet and to the management policies of these queues.

Moreover, an instantaneous load that is too high causes the data packet to be rejected (loss); it is this phenomenon that primarily explains the loss of packets.

It is therefore understood that the phenomenon of congestion induces a high degree of unpredictability in the exchanges between sources and destinations, and as such prevents any guarantee of proper operation for the users of such networks.

Problems with Managing Congestion in a Meshed Environment

A meshing situation is defined when, at a given moment, several independent source sites emit traffic to the same destination site, or when the same source site emits traffic to several destination sites, or any combination of these two cases.

Conventional Management for Processing Congestion

The solutions known in the prior art to allocate resources, and singularly the bandwidth in a point-to-point environment using either the mechanism of priority, implemented at each network element (router), based on the definition of classes of service (Diffserv), or the traffic shaping mechanism from a central site to one or more destinations. The shaping criteria can be more or less static and more or less precise according to the implementations.

These solutions do not take the meshing of the flow into account directly. They are supplemented by static engineering and dimensioning rules. The results in the presence of meshing are very approximate and the lack of control that is inherent therewith does not provide a guarantee of proper operation.

A solution is also known that makes it possible to take into account the situations of the meshed flow type, by coordinating in real time the decisions taken by the devices installed in the different source and destination sites. Such a solution is disclosed in the French patent application "Procédé d'Optimisation Dynamique de la Qualité de Service dans un Réseau de Transmission de Données" No.—FR 2.804.808 filed by the applicant.

This solution makes it possible in particular to recover a predictability of performance. However, it requires equipping all of the sites, which can be complex and/or costly particularly in the case where a reduced number of central sites (typically international, national or regional head offices and data centres) exchange information with a large number of remote sites that use the data transmitted by the central sites (typically agencies), with each one of these remote sites being in relation with one or more central sites.

The purpose of the invention is to overcome the disadvantages of prior art described hereinabove.

DESCRIPTION OF THE INVENTION

The invention recommends a method for remotely controlling the congestion of meshed flow exchanged in a packet mode telecommunication network between a number N of central sites $C_i$ provided with active devices for managing flow and a number M of remote sites $D_m$ devoid of such devices, said central sites exchange between themselves information intended specifically for the management of flow exchanged between each of the central sites and each of the remote sites.

The method according to the invention comprises the following steps:

dynamically associating each remote site to a subset of central sites according to actual traffic observed, establishing a dynamic traffic matrix indicating, for each remote site, the group of central sites exchanging data with this remote site during a given observation period, exchanging between the different central sites of each group of minimal information on the real time traffic with each of said remote sites, defining using the information exchanged in the previous step a local image indicating the state of pre-congestion for the traffic of each remote site (14), calculating the rules for managing traffic from (respectively to) each remote site according to the image defined in the previous step.

Preferentially, flow management comprises the following prior steps:

automatically configuring the active devices of the central sites according to these dynamic regroupings, for each remote site, coordinating the active devices of the central sites in such a way as to manage in real time the traffic going to or coming from the same central sites to/from this remote site.

According to a preferred mode of implementation, the method according to the invention comprises the following steps:

In this embodiment, for each remote site and for each session of exchanging data from (respectively to) this remote site, the calculation of the rules for managing traffic is executed locally in each central site and comprises the following steps:

detecting pre-congestion that is close to the maximum exchange capacity from (respectively to) this site, distributing the transmission resources between the different data exchange sessions according to the states of pre-congestion detected, the nature and the number of these sessions.

In a preferred alternative embodiment, the execution of the step to establish a dynamic traffic matrix is distributed between the active devices for managing flow of the different central sites in such a way that each central site $C_k$:

determines a list of remote sites $D_m$ with which it has exchanged information during the observation period, periodically exchanges said list with all of the other central sites, constitutes a base $\{M_{im}\}$ of information which is the matrix on all of the central sites $C_i$ and remote sites $D_m$, deduces, for each remote site n, the central sites ($C_{kn}$) with which the remote site has exchanged information during the duration of the observation period considered.

In this alternative embodiment, the establishment of a dynamic traffic matrix is executed periodically during a first processing loop having an adapted duration in order to establish an aggregate traffic matrix that takes into account the superposition of all of the traffic types during said period, with the exchanges of information between the central sites and the definition of a local image that indicates the state of pre-congestion are executed periodically during a second processing loop having a short duration in relation to the first processing loop, and adapted to establish a traffic matrix in real time in such a way as to detect in real time the different states of congestion, and the calculation of the rules for managing traffic is executed periodically during a third processing loop having a very short duration in relation to the execution durations of the first and second processing loops in such a way as to adjust the traffic in real time according to the type and quantity of flow exchanged between the central sites and the remote sites.

In another alternative embodiment, the execution of step a) is handled by a central management device in the following way:

Each active device of each central site carries out an activity measurement for the traffic between itself and each remote site, for the two directions of communication.

the centralised management device periodically collects the traffic information on all of the active devices of each central site, the centralised management device deduces, for each remote site, the list of the central sites with which it exchanges information, the centralised management device communicates said lists to the active device of each central site.

The method according to the invention is particularly adapted to (but not exclusively) private networks (whether or not virtual), comprised of a large number M of remote sites (typically several hundred to several thousand) and of a more limited number N of central sites (typically a few dozen) (head offices and data centres): banks, insurance companies, vehicle hire companies, mass distribution, large industrial companies.

The invention also relates to a device for remotely controlling the congestion of meshed flow exchanged in a packet mode telecommunication network between a number N of central sites $C_i$ provided with flux management devices and a number M of remote sites $D_m$ devoid of such devices, with the number N of central sites $C_i$ being small in relation to the number M of remote sites $D_m$.

The device according to the invention comprises:

means for establishing a traffic matrix indicating, for each remote site, the group of central sites exchanging data with this remote site during a given observation period, means for exchanging between the different central sites of each group of minimal information on the real time traffic with each of said remote sites, means for defining, using information exchanged, a local image indicating the state of congestion at the level of each remote site, means for calculating and applying the rules for managing traffic from (respectively to) each remote site according to the image defined.

Said means for establishing a traffic matrix are arranged either in each central site, or in a central management device.

BRIEF DESCRIPTION OF THE DRAWINGS

Other characteristics and advantages of the invention will appear from the description that follows, taken by way of example but not exhaustive, in reference to the annexed figures wherein:

FIG. 5 shows the essential steps of the method according to the invention, FIG. 6 shows a traffic matrix obtained by the method according to the invention, FIG. 7 schematically shows the constitution, according to the invention, of groups of central sites using the traffic matrix in FIG. 6.

DETAILED DESCRIPTION OF PARTICULAR EMBODIMENTS

Figure 1:
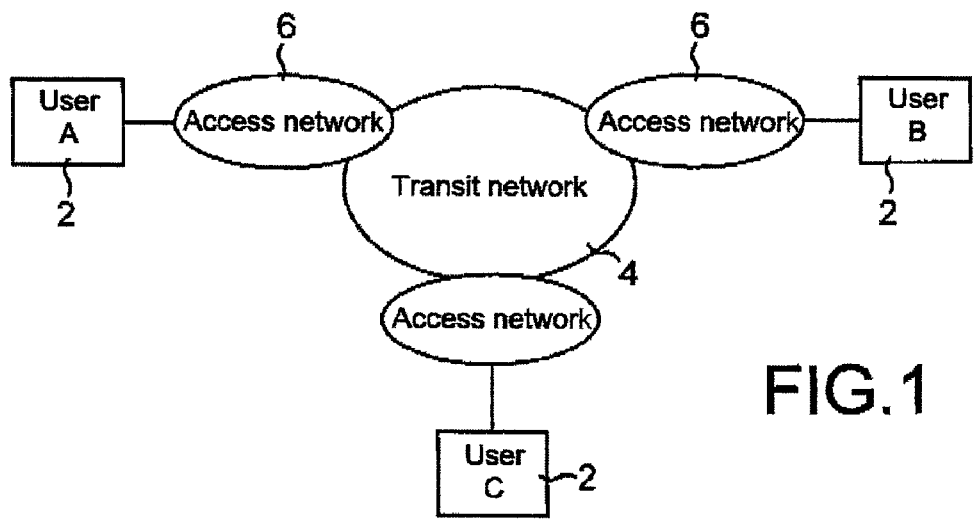
FIG. 1 schematically shows a general structure of a telecommunication network.
Figure 2:
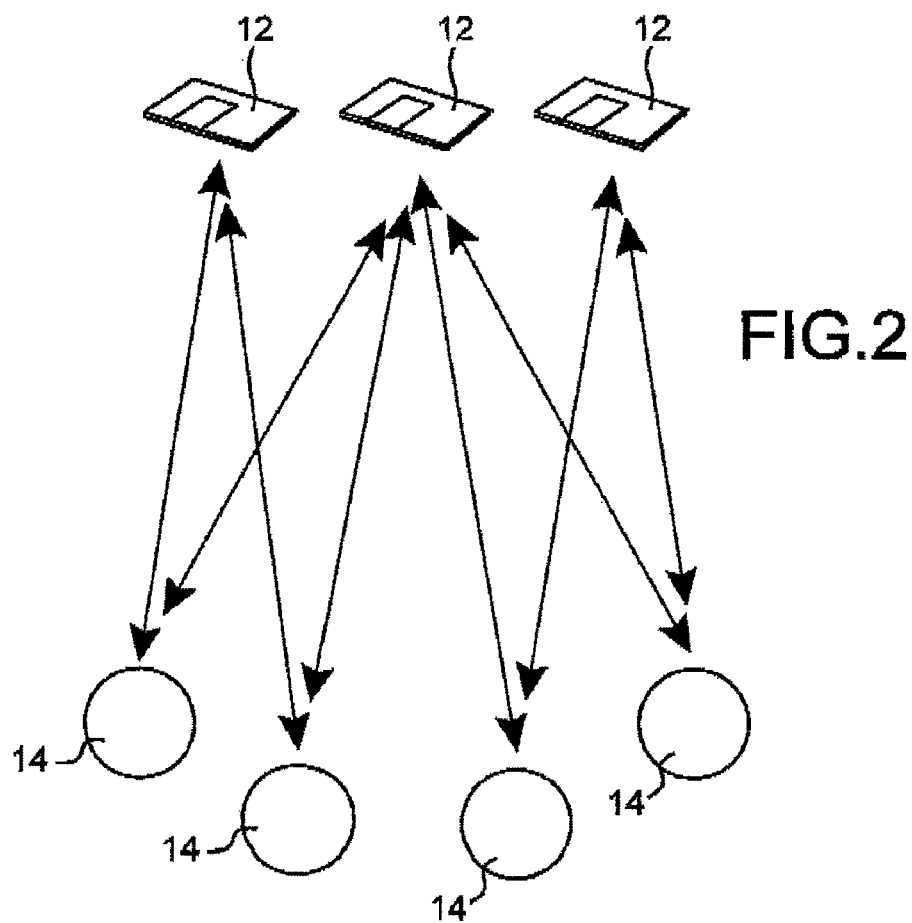
FIG. 2 schematically shows a network architecture model wherein is implemented the method according to the invention.

The following description relates to an application of the method in the context shown in FIG. 2 showing the case where a low number of central sites 12 such as for example international, national or regional head offices and data centres exchange information with a large number of remote user sites 14 such as for example agencies, with each of these remote sites 14 being in relation with a subset of central sites 12.

In this type of architecture, there are two important needs to be satisfied simultaneously:

controlling the performance perceived by the users of remote sites 14, despite the complexity generated by the meshing of the flow (simultaneous communication to/from several central sites).

limiting the number of active devices responsible for managing traffic, so as to simplify and obtain a deployment with a low cost.

Figure 3:
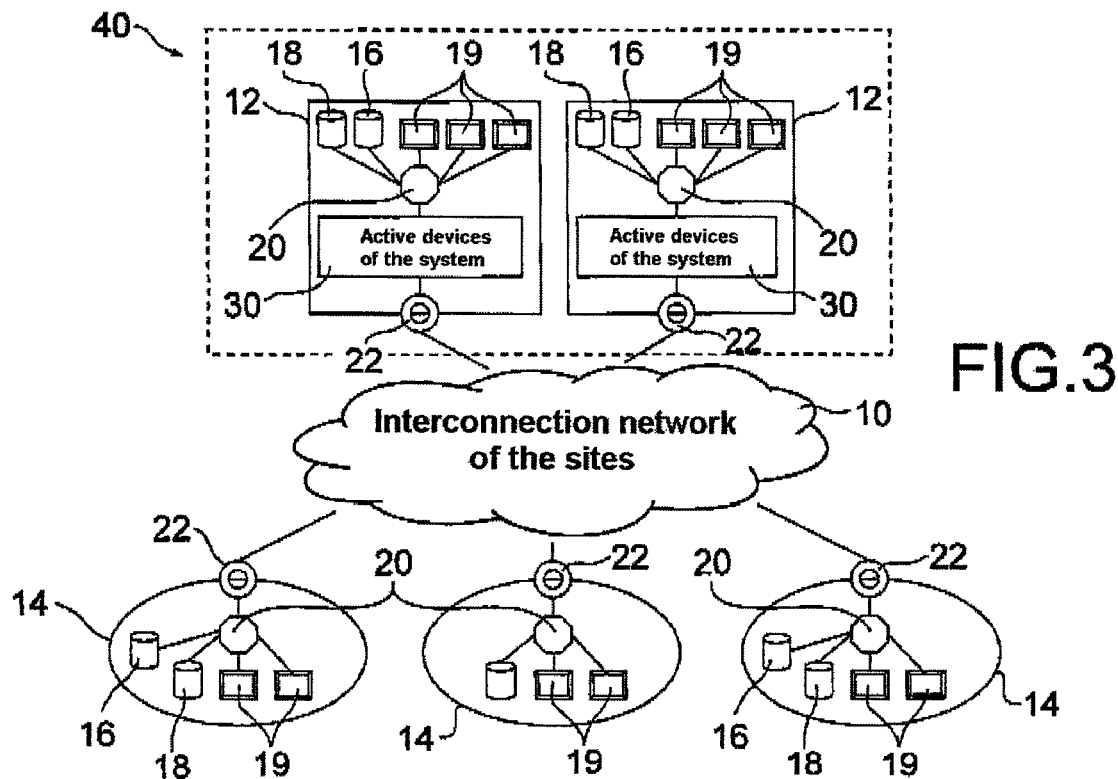
FIG. 3 shows a network in accordance with the model in FIG. 2 comprising central sites and remote sites implementing the method according to the invention, FIG. 4 schematically shows data flows exchanged between two central sites and three remote sites in the network in FIG. 3.

FIG. 3 shows an interconnection network 10, using the IP protocol for example, that interconnects a set of two central sites ($C_i$) 12 with a set of three remote sites ($D_m$) 14. The technology or technologies used within this interconnection network are of any type, for example: MPLS, Frame Relay, ATM, ADSL, etc.

Each central site 12 typically comprises one or more application servers 16 and one or more databases 18 common to several users. Central sites 12 can also comprise user workstations 19. All of these elements are connected to a local network switch or concentrator 20. An access device to the interconnection network 22, generally referred to as a CPE (for Customer Premises Equipment) provides the interface between the network 10 and the central sites 12.

Each one of the central sites 12 is provided with an active device 30 intended to remotely control the remote sites 14.

Each remote site 14 typically comprises user workstations 19, but also possibly one or more application servers 16, and one or more databases 18 for the users of the site. All of these elements are typically connected to a local network switch or concentrator 20. An access device to the interconnection network (CPE) 22 provides the interface between the network 10 and the remote site 14.

Traffic Between Sites

To implement the method according to the invention, it is supposed that the main traffic via the network 10 is comprised of unidirectional or bidirectional exchanges between the central sites 12 and the remote sites 14. The latter are assumed devoid of active devices.

Figure 4:
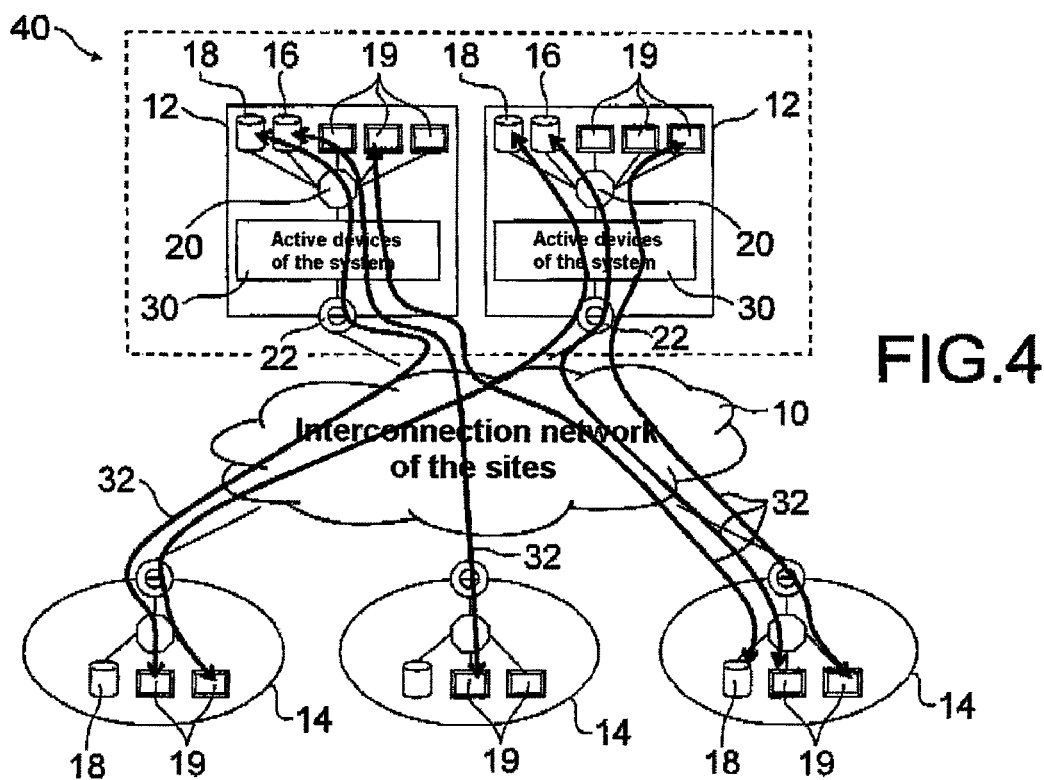

The traffic in the network 10 is shown schematically by the arrows 32 in FIG. 4.

In particular:
a remote site 14 can exchange a flow simultaneously with several central sites 12,
a central site 12 can exchange a flow simultaneously with several remote sites 14,
the central sites 12 can exchange a flow simultaneously between themselves,
the remote sites 14 do not exchange a flow between themselves.

It is also considered that the traffic between the different central sites 12 and the remote sites 14 is dynamic, i.e. that it changes rapidly in terms of space (changes in the sites that are exchanging amongst themselves), in terms of volume, (changes in the quantity of information to be exchanged) and well as in nature (changes in the type of information which is exchanged).

Control System

Each active device 30 is installed in such a way as to:
be aware of the traffic between the central site 12 on which it is installed and the remote sites 14;
be aware of any traffic to/from the other central sites 12;
be able to communicate with the other active devices, for example but not necessarily through the network 10;
be able to intercept the user traffic of the central site 12 in such a way as to reorganise it in case of need.
These active devices 30 are typically comprised of:
a central unit and read-only and random access memory needed to execute the software;
network interfaces to capture and reinject the user traffic;
network interfaces to communicate between themselves (the latter can be the same interfaces as the capture and reinjection interfaces of the user traffic);
an integrated software making it possible to communicate, execute calculation algorithms, make decisions and apply them.

In a first alternative embodiment, the active devices act between themselves without making use of a central device.

In a second alternative embodiment, the active devices interact with a central software connected to any point in the network 10 and with which it can exchange information.

Principles of the Remote Control of Meshed Flow

In a preferred embodiment, the method according to the invention comprises the following steps:

dynamically associating each remote site 14 to a subset of central sites 12 according to actual traffic observed,
automatically configuring the active devices 30 of the central sites 12 according to these dynamic regroupings,
coordinating the active devices of the central sites 12 in such a way as to manage in real time the traffic going to or coming from the same remote sites 14.

Remote control of meshed flow is then carried out by all of the active devices that are working in real time.

FIG. 5 shows the steps of a particular example of implementation of the method according to the invention.

These steps consist in:
determining the traffic matrix between the central sites 12 and the remote sites 14 in the medium/long term (step 50),
establishing (step 52) Remote Coordination Groups (RCG) 40 (see FIGS. 3 and 4) comprising the identity of the remote site 14 that must be controlled from the central sites 12, the list of the central sites 12 that regularly have traffic with this remote site 14 and which must therefore coordinate themselves in order to guarantee the best allocation of resources,
exchanging information on the traffic in real time between the active devices 30 of the central sites 12 of the same group 40 (step 54),
constituting on each active device 30 the local image of the traffic of each remote site 14 (step 56),
determining the rules for managing traffic by the active devices 30 of the central sites 12 (step 58),
conditioning the incoming and outgoing traffic by the active devices 30 of the central sites 12 (step 60).

The steps described hereinabove are executed in three loops, a first loop 62 for management in the medium/long term, a second loop 64 for management in the short term and a third loop 66 for control in the very short term. It is the association of these three processes in a closed loop, combined with the behaviour of the network and of the applications, that provides the proper operation of the whole and allows for the control of meshed traffic.

Determination of the Traffic Matrix in the Medium/Long Term (Step 50)

This step 50 consists in determining, for each remote site 14, the central sites 12 with which said remote site 14 exchanges data.

It substantially entails observing the traffic coming from and going to each remote site 14 and to classify it according to the central site(s) 12.

Note that in most of the actual situations, this observation can be carried out over a relatively long period of time (for example one day, or one week). Indeed, it is the aggregate traffic matrix that is sought, i.e. the matrix reflecting the superposition of all of the traffic over the period considered.

The determination of this traffic matrix can be carried out in a centralised manner or in a decentralised manner.

In the centralised alternative,
Each active device 30 of each central site 12 carries out an activity measurement for the traffic between itself and each remote site 14, for both directions of communication.
a centralised management device periodically collects the traffic information on all of the active devices of each central site 12,
this centralised management device deduces, for each remote site 14, the list of the central sites 12 with which it exchanges information, the centralised management device communicates said lists to the active device 30 of each central site 12.

After classification and aggregation, the central management device is then able to determine the traffic matrix concerning each remote site 14. This matrix indicates the list of the central sites 12 with which the remote site 14 has exchanged information during the period considered.

The centralised alternative is well adapted to the cases where the traffic matrix is stable, i.e. varying little over time, which is the most general case in the sense that the central sites 12 are often well identified and undergo few modifications.

In the decentralised alternative, it is the central sites $C_i$ 12 that carry out the processing described hereinabove:

Each active device 30 of central site $C_i$ 12
determines a list of m (m being an integer) remote sites $D_m$ 14 with which it has exchanged information during the observation period considered for both directions of communication,
periodically exchanges this list of sites with all of the other active devices 30 of central sites 12, and
constitutes a base of information which is the matrix on all of the N central sites 12 and M remote sites 14: $\{M_{NM}\}$.
deduces, for each remote site n among the M sites, the central sites k involved ($M_{kn}$).

The decentralised alternative has the advantage of a fully distributed mechanism, which does not require any central function, but does however require additional signalling flows between the central sites 12.

In the likely case of a slow change in the correspondences between central sites $C_i$ and remote sites $D_m$, the period $T_1$ of emission for these flows can be maintained at a very low level (for example, an exchange of information every hour between the central sites 12, which would not present any significant additional load on the network 10).

FIG. 6 shows an example of a traffic matrix obtained by the method according to the invention.

This matrix comprises a line containing all of the remote sites 14 and a column containing all of the central sites 12. The intersections of each line and each column contain a "1" if said sites exchange data and a "0" otherwise.

Constitution of Remote Coordination Groups 40 (Step 52)

An RCG (for Remote Coordination Group) 40 is comprised of:
the identity of the remote site 14 which must be controlled from the central sites 12,
the list of central sites 12 regularly having traffic with this remote site 14, and which must therefore coordinate themselves in order to guarantee the best allocation of resources.

FIG. 7 schematically shows the constitution of a traffic matrix in the medium term as well as the corresponding RCG 40.

Note that the RCG 40 can be deduced directly from the traffic matrix by the active devices (see FIG. 6). They change at the speed of this matrix (medium/long term), and the constitution thereof does not therefore create any substantial processing load internal to the system.

Note also that the traffic between central sites 12 is not taken into account at this stage, since here it is assumed that it is processed by the "conventional" traffic control mechanisms between central sites.

Exchanging Information on the Real Time Traffic Between the Active Devices of Central Sites 12 (Step 54)

This step is carried out by each of the active devices of the central sites 12, for each RCG 40 to which they belong.

It takes into account the real time aspects of the traffic concerning the instantaneous traffic matrix, the nature of this traffic and the number of active users.

A constraint of this step is to find the best balance possible between the two following constraints:
exchanging flow as quickly as necessary in order to, on the one hand, be able to detect the different states of congestion, and on the other hand, adjust the flows according to their nature and their size;
exchanging as little information as possible in order to limit network load and as such guarantee the change (increase) in the size of the system and to make it possible to reach very high degrees of deployment.

In the rest of the description, the traffic will be categorised into "Classes" which are defined according to the nature and size, especially economic, of the applications. This classification of course depends on the activity and on the applications of each organisation. For example:
Class 1: voice traffic—critical,
Class 2: video traffic—moderately critical,
Class 3: critical transactional traffic,
Class 4: non-critical transactional traffic,
Class 5: Internet traffic—moderately critical,
Class 6: file transfers—not critical.

A "Session" is defined as a user station and a server (or another user station, or between two servers etc.) across the network 10, and which exchange information in order to execute a given application (telephone conversation, data transfer, access to a Web site, etc.). The location and/or identity of the workstation and/or server and/or application make it possible to match the session with its Class. Note also that there can be many different sessions between the same two sites. Moreover, the same user station can be involved simultaneously in several sessions.

Type of Exchanges

This is the Remote Coordination Group $RCG_m$, relative to the remote site m. The exchanges serve at least two purposes: detecting congestion and fine tuning flows.

Detecting Congestion:
Each active device of central site $C_i$ member of this group $RCG_m$ periodically emits to the other active devices on the central sites of the group at least the following information:
$TC_iD_m$: rate emitted by the central site i to the remote site m (bit/s),
$TD_mC_i$: rate received by the central site i from the remote site m (bit/s).

Fine Tuning the Flow:
Each active device of central site $C_i$ member of the group also emits to the other active devices of the central sites of the group the following information:
$S_kC_iD_m$: number of active sessions of the class K of the central site i to the remote site m,
$S_kD_mC_i$: number of active sessions of the class K of the remote site m to the central site i.

The period $T_3$ of emission of this information must be relatively short, since it must make it possible to follow the changes of the traffic in real time. In the current networks, it can be considered that a period of about one to a few seconds is suitable.

Quantifying Exchanges

Let $D_m$ be a remote site such that, at a given instant:
it is active to/from C central sites $C_i$ simultaneously (the members of the $RCG_m$);
the sessions are bidirectional to/from each of the central sites $C_i$;

it has $K_i$ classes of active traffic to/from each of the central sites $C_i$;

each TCD and TDC information has a length of $L_t$ bytes;

each SCD and SDC information has a length of $L_s$ bytes;

For the control of the $RCG_m$, each active device of central site $C_i$ involved will have to generate with a period $T_3$ a message (or a set of messages) to each of the (C-1) other central sites, of which the total length is:

Rate for each direction+number of active sessions for each class and for each direction=$2*(L_t+K_i*L_s)$ In sum, the central site $C_i$ thus emits $[1/T_3*(C-1)*2*(L_t+K_i*L_s)*8]$ bits/second of messages concerning the remote site $D_m$.

Example of a numerical application:

$T_3$=1 second

C=4 central sites members of the RCG $K_i$=4 classes of active traffic between $D_m$ and $C_i$.

$L_t$=2 bytes $L_s$=2 bytes

Total rate of messages coming from $C_i$=1*3*2*(2+4*2)*8=480 bit/s

Note that this value is particularly modest with regards to the rates usually available in the central sites (currently several Mbit/s to several Gbit/s).

Constitution of the Images of the Traffic (Step 56)

Local Image of the Local Activity

Each active device 30 of central site 12 constitutes an image of its own activity for the flow of data to/from all of the remote sites 14 and all of the other central sites 12.

This step does not require any exchanging of information with other devices.

Let $C_i$ be a central site, this site will construct the image $IL_i$ of its local activity which is constituted at least by:

$Teg_i$: Total rate going from the interconnection network 10 to the central site $C_i$, $Tig_i$: Total rate coming from the central site $C_i$ to the interconnection network 10, $Seg_{k,i}$; i: Total number of active sessions for each class k of traffic and going from the interconnection network 10 to the site $C_i$, $Sig_{k,i}$; i: Total number of active sessions for each class k of traffic and coming from the site $C_i$ to the interconnection network 10.

By numbering the classes of traffic K from 1 to $K_{max}$, we have:

$IL_i = \{Teg_i; Tig_i; Seg_{1,i}; Seg_{2,i}; \ldots Seg_{Kmax,i}; Sig_{1,i}; Sig_{2,i}; \ldots Sig_{Kmax,i}\}$ Local Image of the Remote Activity In this step, each active device 30 of central site 12 will reconstitute an image of the global activity of each remote site 14 for which it is a member of the RCG 40. This image takes into account the activity of the data flows of the remote site 14 to/from all of the central sites 12.

It is important to note that in this step, there is no exchange with the other members of the RCG 40 and that the information exchanged regularly in step 54 is used.

Let $C_i$ be the central site, belonging to the $RCG_m$ of the remote site $D_m$. The site $C_i$ will construct the image $ID_{im}$ of the activity of the remote site $D_m$ which is constituted at least by:

$Teg_m$: Rate going from the interconnection network 10 to the remote site $D_m$, $Tig_m$: Rate coming from the remote site $D_m$ to the interconnection network, $Seg_{k,m}$: Number of active sessions for each class k of traffic and going from the interconnection network 10 to the site $D_m$, $Sig_{k,m}$: Number of active sessions for each class k of traffic and coming from the site $D_m$ to the interconnection network 10.

By numbering the classes of traffic K from 1 to $K_{max}$, we have:

$ID_{im} = \{Teg_m; Tig_m; Seg_{1,m}; Seg_{2,m}; \ldots Seg_{Kmax,m}; Sig_{1,m}; Sig_{2,m}; \ldots Sig_{Kmax,m}\}$ The different images $ID_{im}$ of the activity of the remote site $D_m$ constituted locally at each central site $C_i$ member of the group $RCG_m$ must be as identical as possible.

Construction of the Local Image of the Remote Activity

The image $ID_{im}$ built by the active device 30 of the central site $C_i$ and representing the activity of the remote site $D_m$ is elaborated using the two following operations:

Consolidation,

Filtering.

Figure 8:
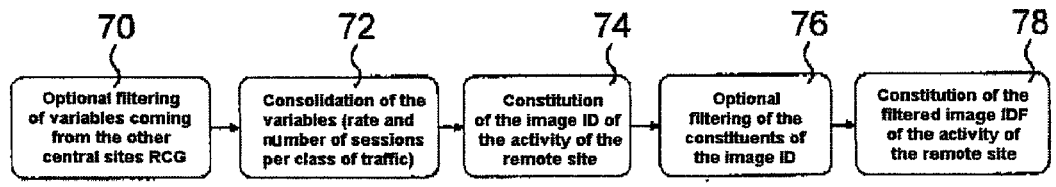
FIG. 8 is a block diagram showing the steps for constructing a local image of the activity of a remote site according to the invention.

FIG. 8 schematically shows the chaining of the operations making it possible to obtain the local image of the remote activity.

This chaining comprises the following operations:

filtering variables coming from the other central sites 12 of a group RCG 40 (step 70). This step is optional.

consolidation of the variables (rates and numbers of sessions per class of traffic) (step 72).

constitution of the image ID of the activity of the remote site 14 (step 74).

filtering the constituents of the image ID (step 76). This step is also optional.

constitution of the filtered image IDF of the activity of the remote site 14 (step 78).

Consolidation of $ID_{im}$:

$Teg_m$=sum of the rates going to $D_m$ and measured by the members of the $RCG_m$=$\Sigma TC_jD_m$ for every $C_j$ of the $RCG_m$ including the central site $C_i$ itself, $Tig_m$=sum of the rates coming from $D_m$ and measured by the members of the $RCG_m$=$\Sigma TD_mC_j$ for every $C_j$ of the $RCG_m$ including the central site $C_i$ itself, $Seg_{k,m}$=sum of the active sessions for each class K of traffic and going to $D_m$, and measured by the members of the $RCG_m$=$\Sigma S_kC_jD_m$ for every $C_j$ of the $RCG_m$ including the central site $C_i$ itself, $Sig_{k,m}$=sum of the active sessions for each class K of traffic and coming from $D_m$, measured by the members of the $RCG_m$=$\Sigma S_kD_mC_j$ for every $C_j$ of the $RCG_m$ including the central site $C_i$ itself.

Filtering of $ID_{im}$:

In such a way as to absorb the irregularities and mismatches linked with the periods of measurement and with the transmission delays for information, it may be necessary to carry out a filtering of the "low pass" type on the different variables.

Different methods of filtering can be used. For example the exponential mean allowing for a rapid filtering in calculation and not costly in memory, and which is defined by the formula:

$$VF_n = [(Q-1)*VF_{n-1} + Vn]*1/Q,$$

with the following notation conventions:

$VF_n$=variable V filtered at instant n $VF_{n-1}$=variable V filtered at instant n−1

$V_n$=variable V before filtering at instant n

Q=filtering coefficient

We shall now denote as $IDF_{im}$ the filtered image of the activity of the remote site $D_m$ such as reconstituted by the central site $C_i$. In order to avoid complicating the notations, we shall not modify the indexes of the different constituents of $IDF_{im}$.

Note that this filtering can also be carried out on each variable received from the other central sites 12, prior to calculating the image $ID_{im}$.

Accuracy Sought

The delays for transmitting the information exchanged in step 54 and other sources of uncertainty (rounding, etc.) will be the cause of slight differences between the different images $IDF_{im}$ of the activity of the site $D_m$ constituted by the different members $C_i$ of the $RCG_m$.

It is however necessary to ensure that these differences are as low as possible. In practice, a relative difference of a few percentage points will yield correct results.

A good compromise must therefore be sought linking the variability of the traffic, the period of emission of the information within the RCG 40 and the filtering coefficients.

Calculating Bandwidth Rules by the Central Sites (Step 58)

In this step, each central site calculates its rules for managing traffic using its filtered image IDF of the global activity of the remote sites for which it is a member of the RCG, and of the image IL of its local activity.

Note that in this step, there is no exchange with the other members of the RCG. Only the images IL and IDF constructed using the information exchanged regularly in step 54 are used.

This step is comprised of two main operations:

Detecting pre-congestion

Allocating resources

Figure 9:
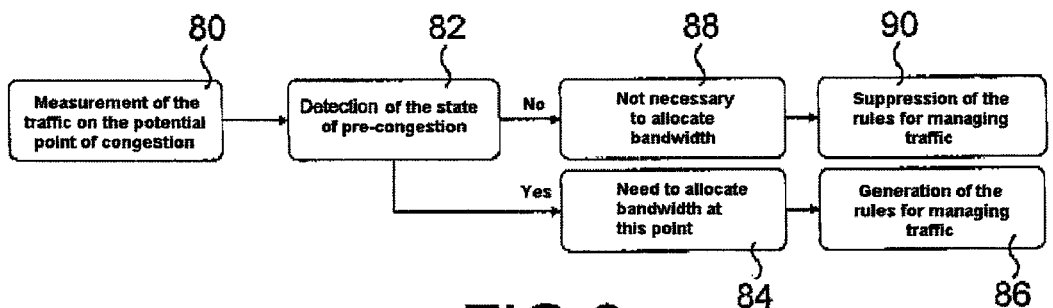
FIG. 9 is a block diagram showing the steps for calculating the bandwidth by the central sites according to the invention.

FIG. 9 schematically shows the chaining of the operations making it possible to obtain the calculation of the bandwidth allocation rules.

This chaining comprises the following operations:

measuring the traffic on the potential point of congestion (step 80).

detecting the state of pre-congestion (step 82).

If a pre-congestion is detected, decide (step 84) that the resources in bandwidth must be allocated to the potential point of pre-congestion, and generate rules for managing traffic (step 86).

If no pre-congestion is detected, decide (step 88) that it is not necessary to allocate resources in bandwidth to the potential point of pre-congestion, and suppress the rules for managing traffic (step 90).

Detecting States of Pre-congestion

The congestion of the site $D_m$ is defined as a state wherein the rate (as input and/or as output) is equal or too close to the maximum capacity authorised by the interconnection network 10, which introduces a bad quality of service.

The method according to the invention makes it possible to anticipate these states of congestion.

For a given site, the different congestions are modelled by reducing them to the three following situations in the interconnection network:

the access network to the site;

the access site to the network;

the capacity of the network in transit between the site and each of the other sites.

In order to prevent network congestions, the states of pre-congestion for which the rate is approaching the maximal capacity must be detected, but without having yet reached the state of congestion.

The operation of detecting the pre-congestion carried out by the site $C_i$ consists in determining if there is a pre-congestion and if this is the case, determine its type among the three preceding types.

Several principles for detecting the congestion can be used without leaving the framework of the invention. In particular, the detection can be carried out using the measurement of the actual rate or using the measurement of the quality such as disclosed in U.S. Pat. No. 2,804,808 of the applicant. These principles can moreover be combined.

The principle of detection by measuring rates will now be described by way of example.

The effective capacity of the network at the different access points (central site, remote site, between sites) for each direction of communication is assumed to be known in advance by outside means (static declaration, learning, etc.).

Take the following capacities:

$BW_{eg}$, representing the capacity of the access to the site considered in the direction network to site, $BW_{ig}$, representing the capacity of the access to the site considered in the direction site to network, $BW_{r,s}$, representing the transfer capacity of the site r to the site s.

Take the following relative safety margins, between the interval [0%, 100%]:

$M_{eg}$=relative safety margin to prevent the congestion of the access network to site $M_{ig}$=relative safety margin to prevent the congestion of the access site to network $M_{r,s}$=relative safety margin to prevent the congestion of the site r to the site s Take the following states of pre-congestion (Booleans, = TRUE if the state of pre-congestion is detected, FALSE in the opposite case):

$PC_{eg}$=pre-congestion of the access to the site considered in the direction network to site $PC_{ig}$=pre-congestion of the access to the site considered in the direction site to network $PC_{r,s}$=pre-congestion of the transit network of the site r to the site s In order to determine the different states of pre-congestion, the active device 30 of the control system of the site $C_i$ performs the following calculations:

Calculating the States of Pre-Congestion of the Central Site $C_i$:

If $(Teg_i) \leq BW_{eg;i}*(1-M_{eg})$, Then $PC_{eg;i}$=FALSE; Else $PC_{eg;i}$=TRUE If $(Tig_i) \leq BW_{ig;i}*(1-M_{ig})$, Then $PC_{ig;i}$=FALSE, Else $PC_{ig;i}$=TRUE Calculating the States of Pre-congestion of the Remote Site $D_m$:

If $(Teg_m) \leq BW_{eg;m}*(1-M_{eg})$, Then $PC_{eg;m}$=FALSE; Else $PC_{eg;m}$=TRUE If $(Tig_m) \leq BW_{ig;m}*(1-M_{ig})$, Then $PC_{ig;m}$=FALSE, Else $PC_{ig;m}$=TRUE Calculating the States of Pre-congestion Between the Central Site $C_i$ and the Remote Site $D_m$:

If $(TC_iD_m) \leq BW_{i;m}*(1-M_{i;m})$, Then $PC_{i;m}$=FALSE; Else $PC_{i;m}$=TRUE If $(TD_mC_i) \leq BW_{m;i}*(1-M_{m;i})$, Then $PC_{m;i}$=FALSE, Else $PC_{m;i}$=TRUE.

Figure 10:
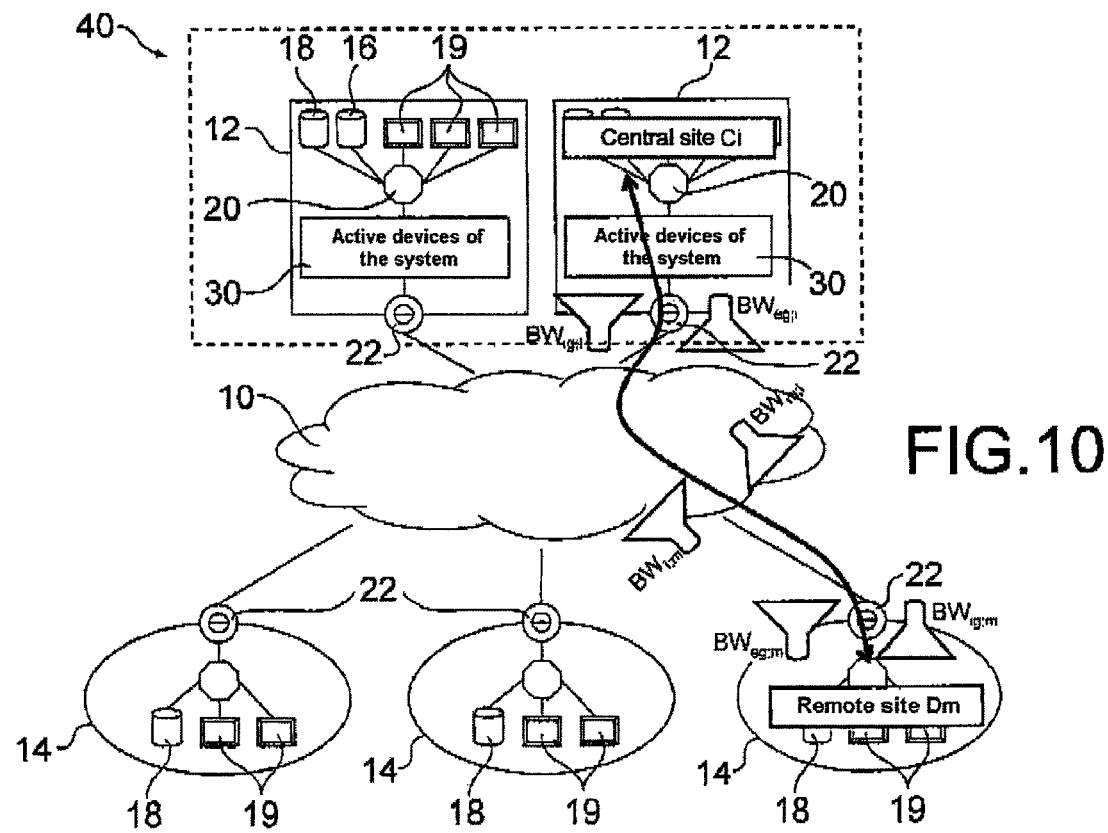
FIG. 10 shows the detection, according to the invention, of a potential point of congestion in the network in FIG. 4, FIG. 11 schematically shows the chaining of the conditioning of the traffic seen from a central site according to the invention.

FIG. 10 schematically shows the potential points of congestion detected.

Decision to Allocate Resources

Allocating resources consists in determining the best manner to adjust each of the sessions between the different sites according to the different states of pre-congestion and of the nature and of the number of these sessions.

The traffic concerning each central site 12 having several potential locations of pre-congestion, there can therefore be several mechanisms for allocating resources that superpose themselves for this site.

Determining the Need to Allocate Resources

In the case where there is no pre-congestion, it is not necessary to allocate resources since the traffic demand is less than network capacity.

To know if resources need to be allocated to the different user sessions the active device 30 of the control system of the site Ci performs the following calculations:

Determining the Need to Allocate Resources for the Access to the Central Site $C_i$:

If ($PC_{eg;i}$=FALSE), then no adjustment of flow input into $C_i$; otherwise adjustment must be made.

If ($PC_{ig;i}$=FALSE), then no adjustment of flow output from $C_i$; otherwise adjustment must be made.

Determining the Need to Allocate Resources for the Access to the Remote Site $D_m$:

If ($PC_{eg;m}$=FALSE), then no adjustment of flow input into $D_m$; otherwise adjustment must be made.

If ($PC_{ig;m}$=FALSE), then no adjustment of flow output from $D_m$; otherwise adjustment must be made.

Determining the Need to Allocate Resources Between the Central Site $C_i$ and the Remote Site $D_m$:

If ($PC_{i;m}$=FALSE), then no adjustment of flow going from $C_i$ to $D_m$; otherwise adjustment must be made.

If ($PC_{m;i}$=FALSE), then no adjustment of flow going from $D_m$ to $C_i$; otherwise adjustment must be made.

Allocation of Bandwidth

Since the principle of allocating the resource is at this stage identical for the six different points of potential congestion described hereinabove, we shall describe these by using only the general indexes x and y such that:

X, y=ig, eg, i (central site) or m (remote site)

When $PC_{x;y}$=TRUE, there is a state of pre-congestion and therefore it is necessary to adjust the flow and allocate bandwidth. This available bandwidth is of value $BW_{x;y}$ and the applicable relative safety margin is $M_z$. The number of active sessions for the class K is $S_{k;x;y}$.

Different policies for allocating bandwidth are possible. By way of example an allocation device by relative priority will assign to each session a portion $BW_s$ of the bandwidth $BW_{x;y}$ available (minus the margin) proportionately to a weight $P_k$ attribute of the class k and to the global activity on the point of congestion, for example with the formula:

$$BW_s = BW_{x;y} * (1-M_z) * P_k * 1/\Sigma_k(P_k * S_{k;x;y})$$

According to the retained bandwidth allocation policy, each central site active device 30 generates the management rules (per session, per session group, etc.) corresponding to each potential point of congestion.

According to a fundamental characteristic of the invention:

detecting states of pre-congestion on the remote sites 14 that do not have any active device uses an image of the traffic of this site which is reconstituted identically by each active device 30 of central site 12;

allocating bandwidth concerning these remote sites 14 is calculated by each active device 30 of central site 12 using the image of all of the traffic, although only a part of this traffic is issued or coming from this central site 12.

This makes it possible to carry out the counter-reaction loop comprising the following operations: allocation of bandwidth, measurement of traffic, detection of pre-congestion and allocation of bandwidth.

Step 6—Conditioning the Incoming and Outgoing Traffic by the Central Sites

This step consists, for each active device 30 of central site 12, in applying the allocation of the bandwidth as calculated in the previous step, for the effective traffic of which it is in charge, i.e. coming from or going to this central site 12.

The conditioning mechanism must have at least the following characteristics:

be able to adjust the flows coming from the central site 12 and also the flows coming from the remote sites 14;

be able to operate at different allocation levels of the bandwidth (local access, remote site 14, central site 12 to remote site 14).

Different mechanisms can be considered to condition the traffic. Among these, the mechanism called "TCP rate control" can be mentioned, useable if the data flow is exchanged via the TCP/IP protocol, queue management, for example "Class based queueing". This latter mechanism functions for all types of flow in the direction Central site 12 to Remote site 14, and for the flows of the TCP/IP type in the direction Remote site 14 to Central site 12.

The finesse of these different mechanisms is also variable.

Preferentially, the method according to the invention uses a solution for conditioning traffic that makes it possible to adjust to the level of the unit session.

Figure 11:
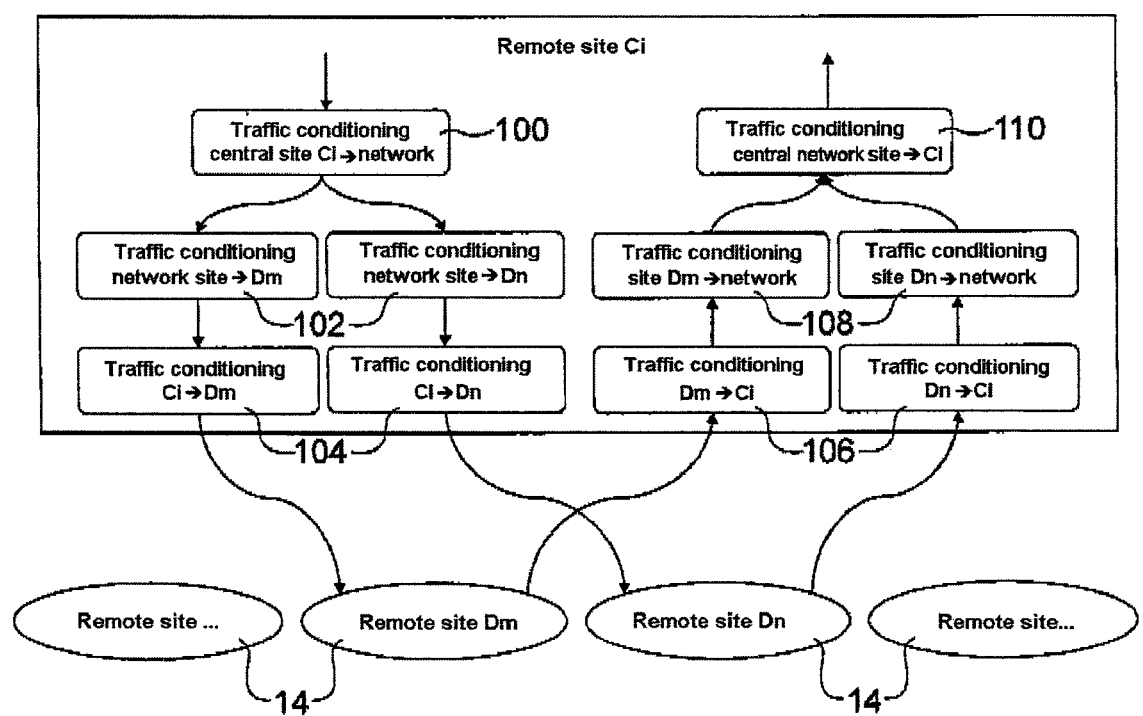

FIG. 11 shows the chaining of the mechanism for conditioning traffic seen from a central site 12.

For a traffic of the central Ci to the network 10, this chaining comprises the following operations:

conditioning of the central site Ci traffic to network (step 100).

conditioning of the network traffic to each remote site $D_m$; $D_n$; etc. (step 102).

conditioning of the central site Ci traffic to each remote site $D_m$; $D_n$; etc. (step 104).

For a traffic from the network to the central Ci 10, this chaining comprises the following operations:

conditioning of the traffic of each remote site $D_m$; $D_n$; etc. to the central site Ci(step 106).

conditioning of the traffic of each remote site $D_m$; $D_n$; etc. to the network (step 108).

conditioning of the network to the central site Ci (step 110).

The method and the device proposed make it possible to allocate bandwidth using a small number of central sites 12 provided with active devices 30, while still managing the remote sites 14 (of a potentially large number), and particularly in the case of meshed flow.

The invention makes it possible to avoid the necessity of installing an active device 30 on each remote site 14.

The invention claimed is:

1. Method for remotely controlling congestion of meshed flow exchanged in a packet mode telecommunication network between a number N of central sites $C_i$ provided with active devices for managing flow and a number M of remote sites $D_m$ devoid of such devices, said central sites exchanging between them information intended specifically for managing the flow exchanged between each of the central sites and each of the remote sites, the method comprising the following steps:

dynamically associating each remote site to a subset of central sites according to actual traffic observed, establishing a dynamic traffic matrix indicating, for each remote site, the group of central sites exchanging data with this remote site during a given observation period, the establishment of the dynamic traffic matrix being executed periodically during a first processing loop having a duration configured to establish an aggregate traffic matrix that takes into account the superposition of all of the traffic types during said period, exchanging between the different central sites of each group of minimal information on real time traffic with each of said remote sites, the exchanges of information between the central sites and the definition of a local image that indicates the state of pre-congestion being executed periodically during a second processing loop having a duration configured to establish a traffic matrix in real time in such a way as to detect in real time the different states of congestion, defining using the information exchanged in the previous step a local image indicating the state of pre-congestion for the traffic of each remote site, calculating rules for managing traffic exchanged with each remote site according to the image defined in the previous step;

the method characterized in that the calculation of the rules for managing traffic is executed periodically during a third processing loop having a very short duration in relation to the execution durations of the first and second processing loops in such a way as to adjust the traffic in real time according to the type and quantity of flow exchanged between the central sites and the remote sites.

2. The method set forth in claim 1, characterised in that said flow management comprises the following prior steps:

automatically configuring the active devices for managing flow of the central sites according to these dynamic regroupings, for each remote site, coordinating said active devices in such a way as to manage in real time the traffic going to or coming from the same central sites to/from this remote site.

3. The method set forth in claim 2, characterised in that, for each remote site and for each session of exchanging data with this remote site, the calculation of the rules for managing traffic is executed locally in each central site and comprises the following steps:

detecting pre-congestion that is close to the maximum exchange capacity from (respectively to) this site, distributing the transmission resources between the different data exchange sessions according to the states of pre-congestion detected, the nature and the number of these sessions.

4. The method set forth in claim 1, characterised in that the execution of the establishment of the dynamic traffic matrix is distributed between the active devices for managing flow of the different central sites in such a way that each central site $C_k$:

determines a list of remote sites $D_m$ with which it has exchanged information during the observation period, periodically exchanges said list with all of the other central sites $C_i$, constitutes a base $\{M_{im}\}$ of information which is the matrix on all of the central sites $C_i$ and remote sites $D_m$, deduces, for each remote site n, the central sites ($C_{kn}$) with which said remote site n has exchanged information during the duration of the observation period considered.

5. The method set forth in claim 1, characterised in that the establishment of a dynamic traffic matrix is handled by a central management device in the following way:

each active device of each central site carries out an activity measurement for the traffic between itself and each remote site, for the two directions of communication.

the centralised management device periodically collects the traffic information on all of the active devices of each central site, the centralised management device deduces, for each remote site the list of the central sites with which it exchanges information, the centralised management device communicates said lists to the active device of each central site.

6. The method according to claim 1, characterised in that the number N of central sites $C_i$ is less than the number M of remote sites $D_m$.

7. Device for remotely controlling congestion of meshed flow exchanged in a packet mode telecommunication network between a number N of central sites $C_i$ provided with active devices for managing flow and a number M of remote sites $D_m$ devoid of such devices, the device comprising:

means for establishing a traffic matrix indicating, for each remote site, the group of central sites exchanging data with this remote site during a given observation period, the establishment of the dynamic traffic matrix being executed periodically during a first processing loop having a duration configured to establish an aggregate traffic matrix that takes into account the superposition of all of the traffic types during said period, means for exchanging between the different central sites of each group of minimal information on real time traffic with each of said remote sites, the exchanges of information between the central sites and the definition of a local image that indicates the state of pre-congestion being executed periodically during a second processing loop having a duration configured to establish a traffic matrix in real time in such a way as to detect in real time the different states of congestion, means for defining using information exchanged a local image indicating the state of congestion at the level of each remote site, means for calculating and applying rules for managing traffic exchanged with each remote site according to the image defined, the calculation of the rules for managing traffic is executed periodically during a third processing loop having a very short duration in relation to the execution durations of the first and second processing loops in such a way as to adjust the traffic in real time according to the type and quantity of flow exchanged between the central sites and the remote sites.

8. The device set forth in claim 7, characterised in that said means for establishing a traffic matrix are arranged in each central site.

9. The device set forth in claim 7, characterised in that said means for establishing a traffic matrix are arranged in a central management device arranged in the network.

* * * * *

UNITED STATES PATENT AND TRADEMARK OFFICE
CERTIFICATE OF CORRECTION

PATENT NO. : 7,804,779 B2  
APPLICATION NO. : 12/095944  
DATED : September 28, 2010  
INVENTOR(S) : Thierry Grenot et al.

Page 1 of 1

It is certified that error appears in the above-identified patent and that said Letters Patent is hereby corrected as shown below:

Title Page;
On page 1 section (73) please delete "Rosses" and insert therefor --Roses--.

Signed and Sealed this
Eleventh Day of January, 2011

David J. Kappos
*Director of the United States Patent and Trademark Office*